(No Model.) 2 Sheets—Sheet 1.

W. AMES.
VARIABLE DRIVE FOR MACHINE TOOLS.

No. 548,860. Patented Oct. 29, 1895.

Witnesses. Inventor:
W. J. Withrow. Walter Ames.
H. T. S. Young. by Fetherstonhaugh & Co (No Model.) 2 Sheets—Sheet 2.

W. AMES.
VARIABLE DRIVE FOR MACHINE TOOLS.

No. 548,860. Patented Oct. 29, 1895.

Witnesses:
J. L. Edwards, Jr.
Fred. J. Dole.

Inventor:
Walter Ames:
By his Attorney
F. H. Richards

UNITED STATES PATENT OFFICE.

WALTER AMES, OF TORONTO, CANADA.

VARIABLE DRIVE FOR MACHINE-TOOLS.

SPECIFICATION forming part of Letters Patent No. 548,860, dated October 29, 1895.

Application filed May 3, 1895. Serial No. 547,959. (No model.)

*To all whom it may concern:*

Be it known that I, WALTER AMES, of the city of Toronto, in the county of York, in the Province of Ontario, Canada, have invented certain new and useful Improvements in Variable Drives for Machine-Tools, of which the following is the specification.

This invention relates to variable-speed driving mechanism, the object being to furnish an improved driving mechanism especially adapted for use in connection with machine-tools and other machines in which the machine-spindle requires to have a variable velocity, and whereby the driving-spindle and element may have its velocity of rotation changed during the rotation of the same and relatively to the driving-wheel or member; also, whereby this relative change of velocity may be effected by means of variable-speed apparatus connected and operating as a retaining apparatus for one portion of the principal driven gearing.

By means of my present improvements a variability in the speed driving member is effected through the combined operation of a positively-acting driving apparatus with a negatively-acting driving apparatus having therein a variable-speed device.

Figure 1:
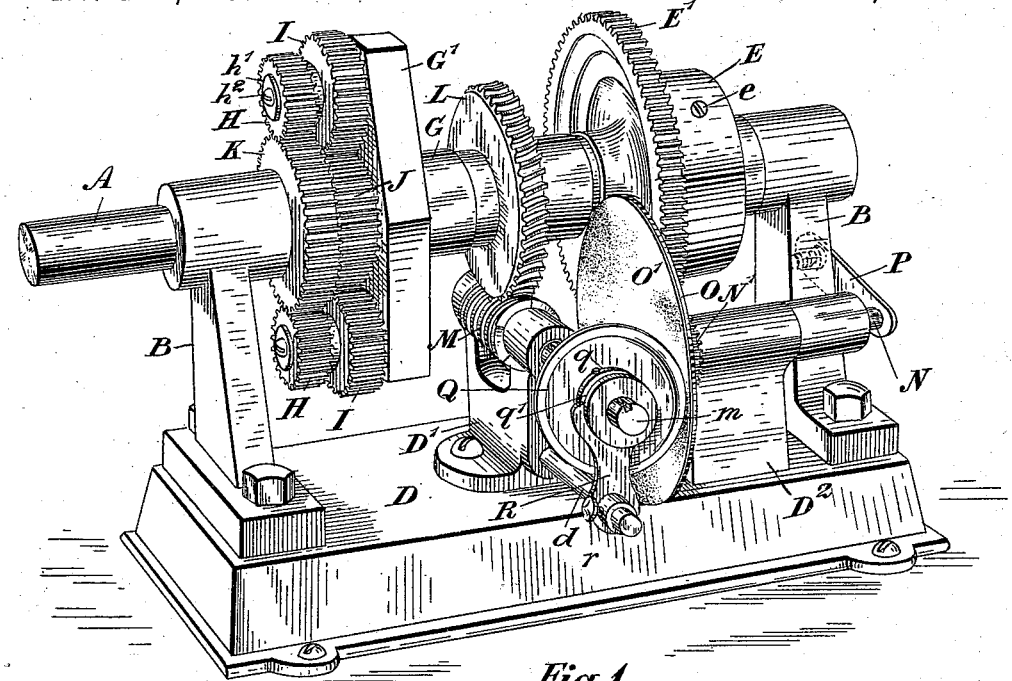
Figure 2:
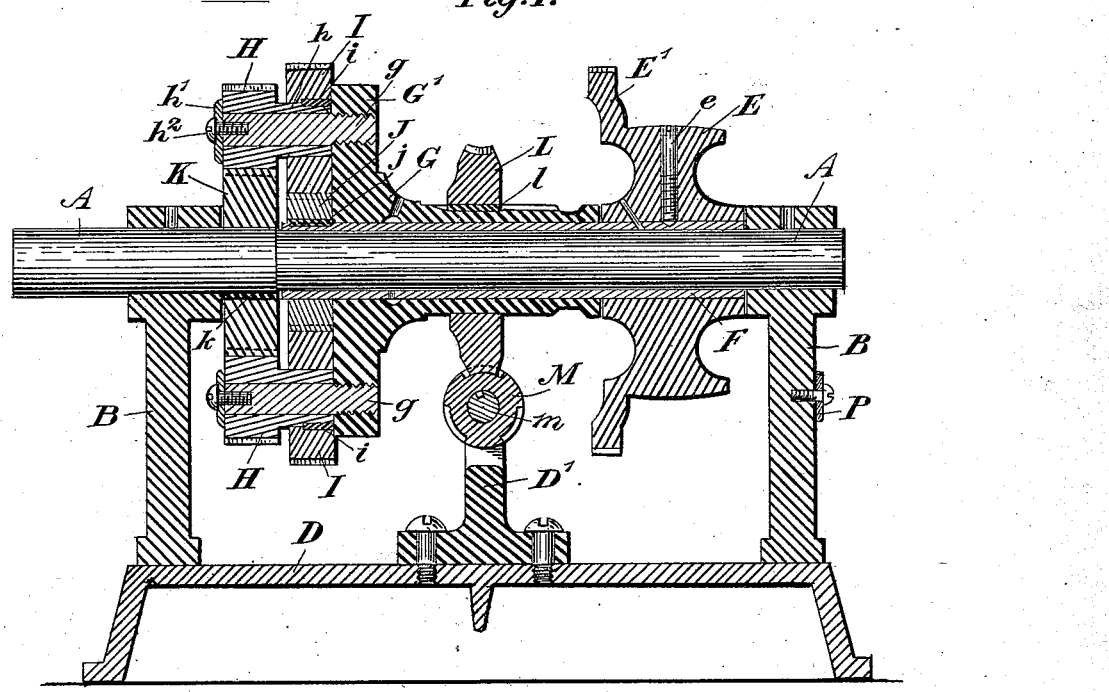
Figure 3:
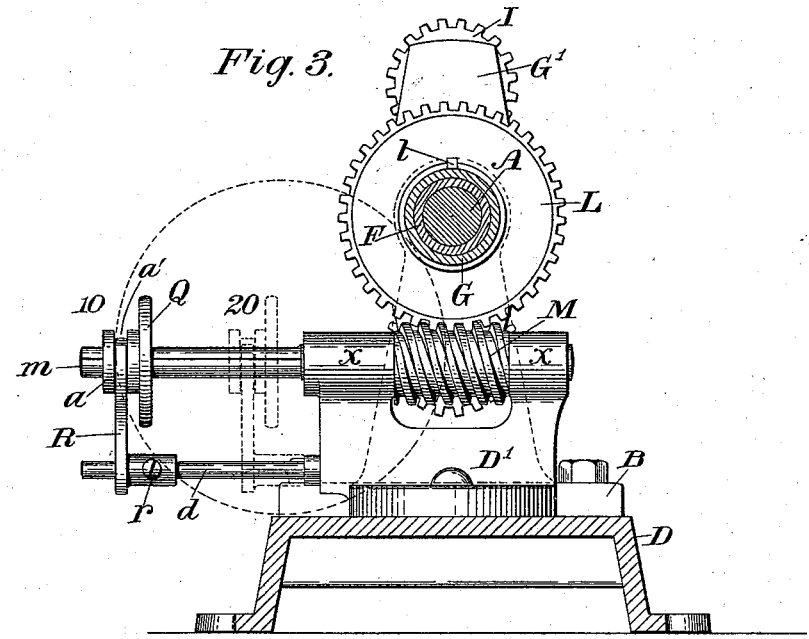
Figure 4:
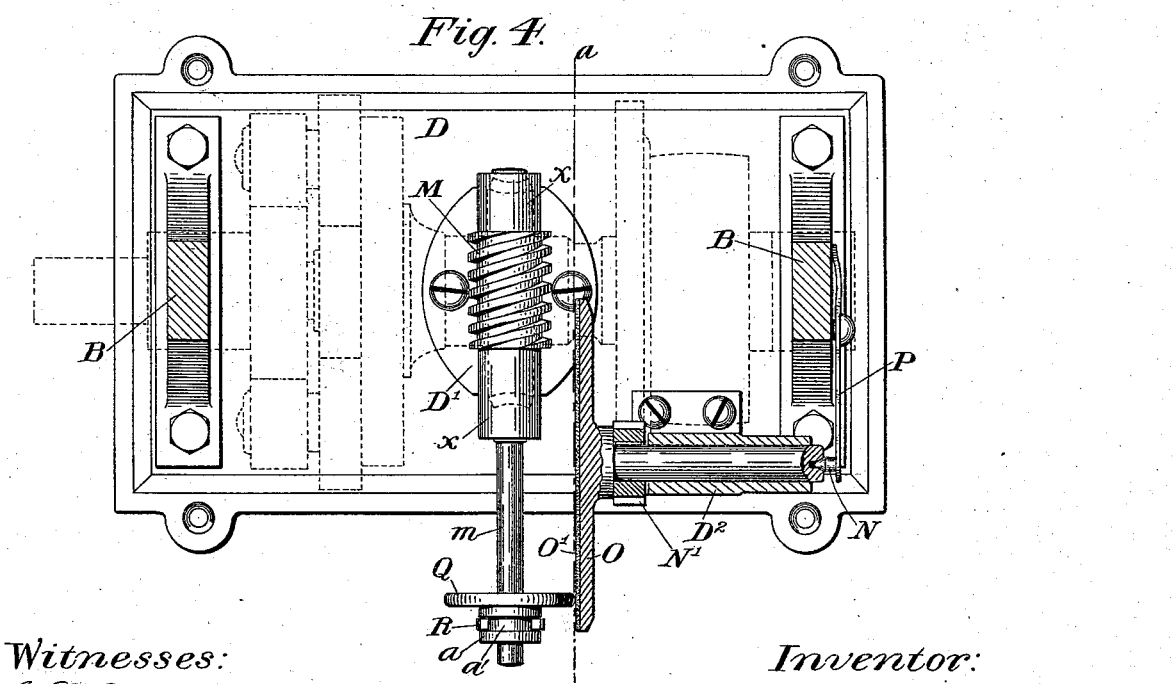

In the drawings accompanying and forming part of this specification, Figure 1 is a perspective view of a variable-driving mechanism embodying my present improvements. Fig. 2 is a vertical longitudinal view through the center of the mechanism. Fig. 3 is a transverse sectional elevation in line $a\,a$, Fig. 4, showing the parts at the left hand of said line as seen from a point at the right hand thereof. In this view, which especially illustrates the variable-speed device of the negatively-acting driving apparatus, the frictional driving-wheel Q is shown in one position at 10 in solid lines and at another position at 20 in dotted lines. Fig. 4 is a sectional plan view of the machine for more fully illustrating certain normal features of the mechanism shown in the preceding views.

Similar characters designate like parts in all the figures of the drawings.

My improved driving mechanism, in the preferred organization thereof shown in the drawings, comprises two principal portions or apparatus, one of which I designate as the "positive" or "forwardly" driving mechanism and the other of which I designate as the "negatively-driving" apparatus. Said member or forwardly-driving apparatus may properly consist, as herein illustrated and described, of a driving member or wheel and a driven member or shaft and gearing connecting said driving and driven members, whereby on the rotation of the driving member the driven member will be correspondingly rotated. This operation of the driven member from the driving member is effected through an independently-rotatable member with which the intermediate gearing referred to is connected.

In the mechanism which I have illustrated in the drawings the driven member consists of a shaft A, which shaft is shown provided with a driven gear K, fixed on said shaft by means of a key or other holding device $k$. The principal driving member consists of the gear-wheel J, which is shown fixed by means of the key or other suitable fastening device $j$ on a tubular shaft or sleeve, (herein designated by the character F and shown rotatably supported on the continuation of the driven member or shaft A.) In practice, however, said shaft A may not be continued as shown, but may be divided at a point between the driven wheel K and the driving-wheel J, in which case that portion of the shaft A at the left hand in Figs. 1 and 2 would constitute a driven member, while that portion of the shaft A at the right hand on said division would constitute merely a support for the shaft F. This operation in the mode of fitting up the mechanism I deem to be within the ordinary skill of the mechanic, and therefore does not require further elucidation.

For the purpose of applying power to the principal driven member J and its shaft F, I provide the shaft F with a driving-wheel E, adapted to receive a driven band for rotating the same. The band-wheel E is shown fixed on the shaft F by means of a set-screw $e$. Said band-wheel E is also shown provided with a driving wheel or gear E', whereby, as hereinafter more fully described, the negatively-acting driving apparatus is operated.

As a means for transmitting power from the principal driving member J to the principal driven wheel K, the forwardly-operating portion of my improved driving mechanism is provided with an independently rotatable member suitably supported relatively to the other members of the mechanism and adapted for carrying connecting gearing for connecting the driving-wheel J with the driven wheel K.

In my improved mechanism, which I have illustrated in the drawings, said independently-rotatable member is designated in a general way by G, and is shown in the form of a sleeve or tubular shaft rotatably supported on the tubular shaft F and constructed for carrying intermediate gearing for operatively connecting said wheels J and K. In the present instance said member G is furnished with a stud $g$, fixed thereon and adapted for carrying an intermediate driving device comprising, in practice, two intermediate wheels—the driven intermediate I, meshing with the driving-wheel J, and the driving intermediate H, meshing with the driven wheel K.

The two wheels H and I may be formed integrally in a well-known manner; but the wheel H may, as herein shown, have a tubular hub extension $h$, on which the other intermediate I may be secured by means of some suitable key or fastening device $i$.

As a convenient means for holding the intermediate gearing on the stud $g$, the said stud is shown provided with a flange or collar $h'$, held in place by means of a screw $h^2$.

The foregoing description of an intermediate driving-gearing is made in connection with the upper portions of Figs. 1 and 2. In practice, however, said intermediate gearing may be used in multiple, as also shown in said figures, especially when great power is required and a larger amount of wearing-surface is deemed desirable.

The relative velocities of the driving and driven members of course depend on the relative proportions of the driving-wheels J and K and of the intermediate wheels I and H. In the drawings these proportions are so related that one revolution of the wheel J, provided the member G remains stationary, will operate through the intermediate wheels to rotate the wheel K through one-half of one revolution. It will be evident, however, that other ratios of rotation of said driving and driven members may be obtained by suitably proportioning relative diameters of said several wheels or gears constituting the driving-train of the mechanism.

It will be evident that if the rotation of the member G be relatively smaller in amount the rotation of the speed member K will be correspondingly small, and that if the rotation of the member G be relatively rapid this will reduce the resultant movement of the member K by a correspondingly-large amount.

It is therefore one of the objects of my present invention to furnish for use, in connection with the other portions of my improved driving mechanism, a variable-speed device or apparatus in operative connection with said principal driving member and with said independently-rotatable member, whereby the rotation of the latter member relatively to the former member may be varied for regulating at will, within a given range of movement, the velocity of the shaft A relatively to the principal driving member or wheel J. Said variable-speed device consists of two portions—first, a controlling apparatus in direct operative connection with said independently-rotatable member G, and, second, a variable-speed device proper. Said controlling apparatus consists in some suitable gearing whereby the proper rotation and control of said member G may be secured, and it is one of the objects of my present invention to provide for this purpose a controlling-gearing of an approximately-neutral character whereby, on the operation of the entire mechanism, said controlling-gearing may be operated with a relatively-small amount of power, so that with a driving mechanism of relatively-large size and great power the variable-speed device may be of relatively-small size and power while retaining a high degree of efficiency and reliability. Accordingly I provide the member G with a worm-wheel, which is designated by L, and which is shown fixed on the member G by means of a key or like fastening device $l$.

It will of course be understood that the gear L may be formed integrally with the member G or otherwise, as may be found preferable in any particular instance. The gear-wheel L meshes with the worm M, which is shown mounted on the shaft $m$, that is supported in the bearings $x$ $x$ of the bracket D', that is suitably fixed on the bed D and constitutes a portion of the framework of the mechanism.

The inclination of the teeth L and of the worm-thread of the worm M should be such as to substantially coincide with the normal angle of repose, so as to be, as herein stated, approximately neutral, so as to require a relatively-small amount of power either for holding the member G against rotation or for causing the same to rotate at any required speed within the given limits during the operation of the entire mechanism.

For the purpose of actuating the worm M to give the variable speed required I provide a driving-disk O, which is mounted on the shaft N, that is supported in some suitable bearings D² and has a relatively-small gear N', fixed thereon, meshing with the aforesaid driving wheel or gear E² on the band-wheel.

On the extended end of the shaft $m$ is mounted a frictional wheel Q, which is adapted to slide on said shaft, it being splined thereto, and whose rim is adapted to frictionally engage the face of said driving-disk O.

For normally holding and adjusting the driving-disk in contact with said frictional wheel Q with a steady pressure some suitable device—as, for instance, the spring P—is provided for bearing against the rearward end of the shaft N for sliding said shaft in its bearing to carry the disk O forcibly against the frictional wheel Q.

As a means for adjusting the position of the wheel Q relatively to the axis of the disk O, a guide device R is mounted to slide on the guide-rod $d$, fixed in the bracket D', the arm on said guide engaging in the groove formed in the hub of said friction-wheel, whereby this may be mounted radially on the disk O. By means of this wheel-sliding device the variable-speed device may be regulated for varying the rotation of the worm M, and through this and the gear L the rotation of the member G for reducing by a greater or less amount the movement of the shaft A relatively to the movement of the driving member J.

When the driving member Q is set, as shown by dotted lines at 20, Fig. 3, immediately adjacent to the axis of the disk O, it is evident that the disk O will only rotate the wheel Q with a relatively-small velocity, so as to rotate the worm M relatively slowly and impart a correspondingly-slow rotation to the member G, thereby subtracting but a small increment from the amount of movement normally transmitted from the wheel J through the intermediate wheels I and H to the driving-wheel K when the member G is stationary. If, however, the wheel Q be slid outward on the shaft $m$ to a point more distant from the axis of the disk O, as shown, for instance, by the solid lines at 10, Fig. 3, it is evident that said disk will now impart a greater velocity to the wheel Q and force the worm M and the wheel L to give a correspondingly-greater velocity to the member G, thereby subtracting a relatively-greater amount of movement from the amount which would otherwise be transmitted from the wheel J through said intermediate wheels to the driven wheel K and the shaft or spindle A.

By means of the described organization of my improved mechanism, whereby the variability in the resultant movement—that is, the movement in the shaft A—is effected by subtraction from a given resultant movement and this subtraction effected through a normal and approximately-neutral controlling device for the member G, I am able to obtain a relatively-wide range of speed for the shaft A by means of a relatively-small but efficient and reliable frictional driving device.

Having thus described my invention, what I claim is—

1. In a driving mechanism, the combination with a driven-member carrying a gear; of a tubular driving-member rotatably disposed on said driven-member, and carrying a gear parallel with, and adjacent to the driven-member gear, and also carrying a driving-wheel gear remotely disposed relatively to its other gear and adapted to receive power; an independently-rotatable member comprising a tubular sleeve supported on said driving-member, and carrying pinions meshing with the parallel gears on the driving and driven members, respectively, and adapted to transmit power from the driving-member to the driven-member, and also carrying a worm-wheel intermediate of its pinions and the driving-wheel gear of the driving-member; a worm-shaft carrying a worm in mesh with the worm-wheel; a friction-wheel adjustably supported on the worm-shaft and adapted to control the speed of said worm, and whereby the velocity of the driven-member relatively to the driving-member can be varied independently of the speed of said driving-member; a disk-shaft extending parallel with the driving-member, and carrying a rotating disk in engagement with the friction-wheel and adapted to transmit power thereto; a gear on said disk-shaft in mesh with the driving-wheel gear of the driving-member; and means for holding said disk in frictional engagement with the friction-wheel, substantially as described.

2. In a driving mechanism, the combination with a driven-member having a gear thereon; of a driving-member rotatably supported on said driven-member and carrying a gear, and also having a driving-wheel gear thereon adapted to receive power; an independently-rotatable member comprising a tubular sleeve supported on said driving-member and carrying mechanism for transmitting power from the driving-member to the driven-member, whereby said driven-member will be rotated at a given speed from said driving-member independently of the speed of the independently-rotatable member, and also carrying a worm-wheel; a worm-shaft carrying a worm in mesh with said worm-wheel; an adjustable friction-wheel supported on the worm-shaft and adapted to control the speed of said worm; and whereby the velocity of the driven-member relatively to the driving-member can be varied independently of the speed of said driving-member; a disk-shaft carrying a disk rotatable therewith and in frictional engagement with the friction-wheel, and also carrying a gear in mesh with the driving-wheel gear on the driving-member, whereby power is transmitted to the adjustable friction-wheel to vary the speed of rotation of the worm and thereby the driven-member, substantially as described.

WALTER AMES.

Witnesses:
B. BOYD,
H. T. S. YOUNG.